(12) United States Patent
Ma et al.

(10) Patent No.: US 12,523,318 B2
(45) Date of Patent: Jan. 13, 2026

(54) ACTUATOR AND SPOOL TYPE DIRECTIONAL CONTROL VALVE

(71) Applicant: Danfoss Power Solutions (Zhejiang) Co. Ltd., Zhejiang (CN)

(72) Inventors: Zhongxiao Ma, Zhejiang (CN); Yanre Luo, Zhejiang (CN); Linmu Zhang, Haiyan (CN); Xueli Lu, Haiyan (CN)

(73) Assignee: DANFOSS POWER SOLUTIONS (ZHEJIANG) CO. LTD., Zhejiang (CN)

( * ) Notice: Subject to any disclaimer, the term of this patent is extended or adjusted under 35 U.S.C. 154(b) by 0 days.

(21) Appl. No.: 18/541,804

(22) Filed: Dec. 15, 2023

(65) Prior Publication Data

US 2024/0200686 A1 Jun. 20, 2024

(30) Foreign Application Priority Data

Dec. 20, 2022 (CN) .......................... 202211649132.8

(51) Int. Cl.
*F16K 31/60* (2006.01)
*F16K 31/52* (2006.01)

(52) U.S. Cl.
CPC .......... *F16K 31/602* (2013.01); *F16K 31/523* (2013.01)

(58) Field of Classification Search
CPC ................. F16K 31/602; F16K 31/523; F15B 2211/324; F15B 2211/895; F15B 13/10
See application file for complete search history.

(56) References Cited

U.S. PATENT DOCUMENTS

2022/0025990 A1* 1/2022 Ito ..................... F16K 35/027

FOREIGN PATENT DOCUMENTS

DE 19533679 B4 5/2005

OTHER PUBLICATIONS

Translation of DE 19533679 (Year: 2024).*
Extended European Search Report mailed Apr. 26, 2024, in connection with European Application No. 23216488.9; 9 pages.

* cited by examiner

*Primary Examiner* — Kelsey E Cary
(74) *Attorney, Agent, or Firm* — McCormick, Paulding & Huber PLLC (57) ABSTRACT

An actuator and a spool type directional control valve is disclosed. The actuator includes a catcher and a shaft. The catcher is provided with a first connecting portion and a second connecting portion. The first connecting portion is used to connect to a spool, and the second connecting portion includes a first limiting portion and an avoidance slot which are connected in a circumferential direction. The shaft includes a shaft body and a control member. The shaft body is used to connect to an operation mechanism and is driven to rotate by the operation mechanism, so that: the control member is capable of abutting against the first limiting portion, and driving the catcher to rotate forward by a first angle a via the first limiting portion so as to drive the spool move forward to a first working position; and the control member is capable of rotating freely in the avoidance slot, and the maximum rotation angle c of the control member in the avoidance slot is not less than the first angle a. With the actuator, the hysteresis of the directional control valve may be reduced, and asymmetrical hysteresis of the directional control valve when the spool moving in different directions can also be avoided.

19 Claims, 8 Drawing Sheets

ACTUATOR AND SPOOL TYPE DIRECTIONAL CONTROL VALVE

CROSS-REFERENCE TO RELATED APPLICATION

This application claims foreign priority benefits under 35 U.S.C. § 119 from Chinese Patent Application No. 202211649132.8, filed Dec. 20, 2022, the content of which is hereby incorporated by reference in its entirety.

TECHNICAL FIELD

The present invention relates to hydraulic technology, and in particular, relates to an actuator and a spool type directional control valve provided with the actuator.

BACKGROUND

A directional control valve normally has more than two flowing forms and is provided with more than two oil ports. Communication, cut-off and direction control of hydraulic oil circuits, as well as pressure relief and sequential action control can be achieved via controlling relative movements between a spool and a housing of the directional control valve.

In general, besides the spool and the housing, the directional control valve further includes a control system for controlling movements of the spool relative to the housing. According to the driving type of the control system, the directional control valve may be classified as manual directional control valve, mechanical directional control valve, solenoid directional control valve, hydraulic directional control valve and electro-hydraulic directional control valve. According to the positions of the spool in the valve body during operation of the spool and the number of communicating ways controlled by the directional control valve, the directional control valve may be classified as two-position two-way directional control valve, two-position three-way directional control valve, two-position four-way directional control valve, three-position four-way directional control valve, etc. According to the structural form of the directional control valve, the directional control valve may be classified as spool type directional control valve and rotary type directional control valve.

Figure 1:
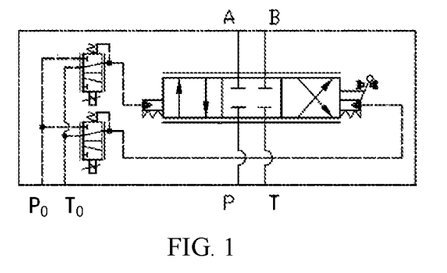
FIG. 1 is a diagram illustrating an operation principle of a three-position four-way directional control valve which can control the movement of a spool via a pilot oil line.

For example, FIG. 1 illustrates an operation principle of a three-position four-way directional control valve in which movements of a spool can be controlled via a pilot oil line. The operation mode of the directional control valve includes:

When the spool is in a middle operation position, an oil inlet port P of a main oil line, an oil return port T of the main oil line, a first oil port A and a second oil port B are not in fluid communication with each other; at the moment, the valve is in a neutral position, and an oil supply system connected to the oil inlet port P of the main oil line stops supplying oil.

When the spool is in a left operation position, the oil inlet port P of the main oil line is in fluid communication with the first oil port A, and the second oil port B is in fluid communication with the oil return port T of the main oil line.

When the spool is in the right operation position, the oil inlet port P of the main oil line is in fluid communication with the second oil port B, and the first oil port A is in fluid communication with the oil return port T of the main oil line.

The switches between above-mentioned different operation modes may be achieved via controlling two pilot valves (specifically, two pilot electric proportional pressure reducing valves) or via manual operation. For example, a manual actuator may be used here in an emergency or for manual testing. As shown in FIG. 1, control oil lines (the dashed line) of the pilot valves are connected with the oil inlet port P0 of the pilot oil line and the oil return port T0 of the pilot oil line.

Figure 2:
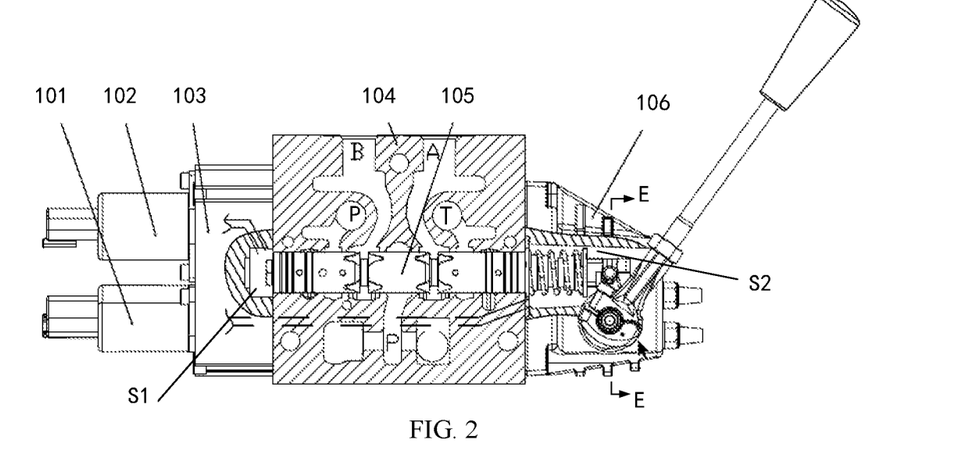
FIG. 2 is an internal cross-sectional diagram of a spool type directional control valve.

For example, FIG. 2 illustrates a spool type directional control valve, the directional control valve includes a first pilot valve 101, a second pilot valve 102, a connecting block 103, a housing 104, a spool assembly 105 and a manual actuator 106. The first pilot valve 101 and the second pilot valve 102 may be pilot electric proportional pressure reducing valve, which are fixedly connected to the housing 104 via the connecting block 103 and located outside the housing 104. The housing 104 is matched with the spool assembly 105 to form four fluid regions which are associated with an oil inlet port P of a main oil line, an oil return port T of the main oil line, a first oil port A and a second oil port B, respectively.

When the spool assembly 105 is in a neutral position, the four fluid regions are independent of each other and do not in fluid communication with each other.

When either of the first pilot valve 101 and the second pilot valve 102 is powered on, pressure oil will be output to push the spool assembly 105 to move axially. With the change of the position of the spool assembly 105, the four fluid regions will be connected in two modes:

When one pilot valve is powered on, the oil inlet port P of the main oil line is in fluid communication with the first oil port A, and the oil return port T of the main oil line is in fluid communication with the second oil port B, that is, P-A and B-T.

When the other pilot valve is powered on, the oil inlet port P of the main oil line is in fluid communication with the second oil port B, and the oil return port T of the main oil line is in fluid communication with the first oil port A, that is, P-B and A-T.

When both the pilot valves are powered off, the spool assembly 105 returns to the neutral position under restoring force of a spring and keeps still.

The above-mentioned movement process of the spool assembly 105 may also be controlled by the manual actuator 106.

Figure 3:
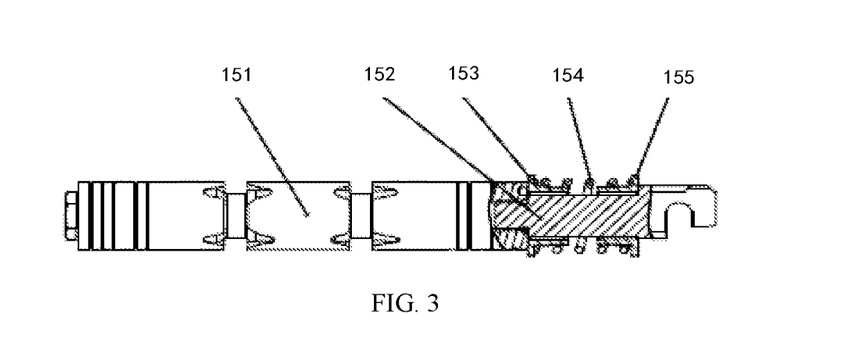
FIG. 3 is a schematic structural diagram of a spool assembly of the spool type directional control valve shown in FIG. 2.

As shown in FIG. 2 and FIG. 3, the spool assembly 105 includes a spool body 151, a pull rod 152, a left stop block 153, a spring 154 and a right stop block 155. The leftward movement of the left stop block 153 is restricted by the housing 104, and the rightward movement of the right stop block 155 is restricted by the manual actuator 106.

When the left side of the spool assembly 105 is pushed by the pressure oil, the right stop block 155 keeps still, the left stop block 153 with the spool body 151 together move to the right, and the spring 154 compresses under the pressure until the left stop block 153 and the right stop block 155 are in contact with each other (it can be learned that the axial displacement of the spool assembly 105 moving to the right is restricted by the gap distance between the left stop block 153 and the right stop block 155).

When the right side of the spool assembly 105 is pushed by the pressure oil, the left stop block 153 keeps still, the right stop block 155 with the spool body 151 together move to the left, and the spring 154 compresses under the pressure until the right stop block 155 and the left stop block 153 are in contact with each other (it can be learned that the axial displacement of the spool assembly 105 moving to the left is restricted by the gap distance between the left stop block 153 and the right stop block 155).

When there is no external force from the pilot valves applied to the spool assembly 105, the spool body 151 remains in the neutral position under the action of the spring 154.

In addition, the right end of the pull rod 152 is provided with a U-shaped open slot. If the pull rod 152 is pushed or pulled by other mechanical means via the U-shaped open slot, the spool assembly 105 may also be controlled to move in the same way as described above.

Figure 4:
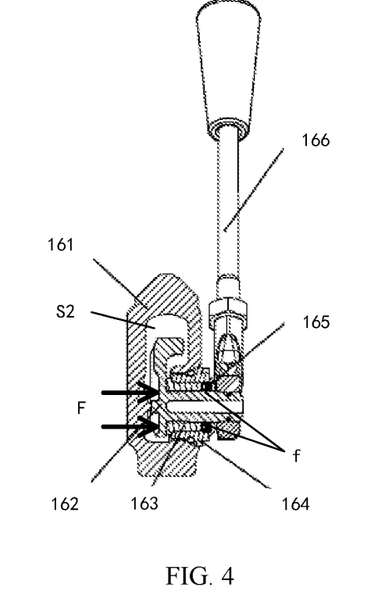
FIG. 4 is a cross-sectional diagram taken along line E-E shown in FIG. 2.
Figure 5:
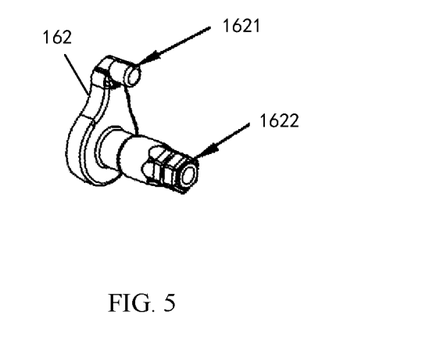
FIG. 5 is a schematic structural diagram of a catcher of the spool type directional control valve shown in FIG. 2.

As shown in FIG. 2, FIG. 4 and FIG. 5, the main parts of the manual actuator 106 include a manual actuator body 161, a catcher 162, a shaft sleeve 163, a threaded plug 164, a sealing ring 165 and a handle 166. The catcher 162 is provided with a cylindrical head 1621 and a shaft 1622. The cylindrical head 1621 is located in the U-shaped open slot described above for pushing and pulling the spool assembly 105 to move axially. An end of the shaft 1622 which is away from the catcher 162 extends out of the manual actuator body 161 for connecting to the handle 166.

Specifically, the catcher 162 is located in an inner cavity of the manual actuator body 161. An end of the shaft 1622 on which the handle 166 is mounted on is with a hexagonal cross section to make sure the catcher 162 and the handle 166 rotate synchronously. The shaft sleeve 163, the threaded plug 164 and the sealing ring 165 are coaxially disposed between a mounting hole of the manual actuator body 161 and the shaft 1622. The catcher 162 and the shaft 1622 may freely rotate relative to the manual actuator body 161 (and the shaft sleeve 163). The catcher 162 may be mounted stably in the manual actuator body 161 by the threaded plug 164. By the sealing ring 165, the sealing performance of the connection position is ensured, and the flowing of hydraulic oil out of the manual actuator body 161 is avoided.

The operation process of the directional control valve includes:
1) When the handle 166 of the manual actuator 106 is rotated by an operator, the catcher 162 can be controlled to rotate synchronously with the handle 166, and meanwhile, the spool assembly 105 is pushed or pulled to move axially.
2) When the handle 166 is released, the catcher 162 and the spool assembly 105 return to the neutral position by restoring force of the spring 154.
3) When the spool assembly 105 is controlled to move by a pilot valve in an electrical way, the catcher 162 and the handle 166 will also rotate with the movement of the spool assembly 105.

Generally, when the spool type directional control valve is controlled by the pilot valve in the electrical way, hysteresis is a very important parameter of evaluating performance of the directional control valve. Detailed analysis is carried out for understanding the reasons for the hysteresis, and it has been found that the reasons for the hysteresis are mainly due to viscosity and mechanical friction force between moving parts and fixed parts of the directional control valve. Moreover, it can be learned from the above description of the function of the actuator 106, that is, when the spool assembly 105 is driven by the pilot valves to move, the catcher 162 and the handle 166 rotate synchronously with the spool assembly, at this moment, in addition to the friction force between the spool assembly 105 and the housing 104, the manual actuator 106 applies additional friction force to the control of the pilot valve. This additional friction force is mainly caused by the following factors:

a) the relative movement between the pull rod 152 and the cylindrical head 1621 of the catcher 162;
b) the relative movement between the catcher 162 with the shaft 1622 and the shaft sleeve 163;
c) the relative movement between the shaft 1622 of the catcher 162 and the sealing ring 165.

Since the contact surfaces in the above factor a) and factor b) are normally in a steel-to-steel manner, the interaction force between the adjacent parts at the contact surfaces is not great, and the friction force caused by the above interaction may be ignored. However in the above factor c), since the contact surfaces between the catcher 162 and the sealing ring 165 make a steel-to-rubber contact, the friction force between the catcher 162 and the sealing ring 165 cannot be ignored, and it has an obvious impact on the increasing of hysteresis to the directional control valve.

Moreover, in the above factor c), the friction force between the catcher 162 and the sealing ring 165 is related to the operation pressure of the hydraulic oil in the manual actuator body 161. The higher the operation pressure of the hydraulic oil is, the greater the friction force between the catcher 162 and the sealing ring 165 is, as a result, another performance problem is caused, that is:

When the spool assembly 105 needs to be moved to the right, a first fluid region S1 (composed of the connecting block 103, the housing 104 and the spool assembly 105) located on the left side of the spool assembly 105 has a high pressure value, a second fluid region S2 (composed of the manual actuator body 161, the housing 104 and the spool assembly 105) on the right side of the spool assembly 105 is fluidly connected to an oil tank, that is, the oil hydraulic pressure in the first fluid region S1 is higher than the oil hydraulic pressure in the second fluid region S2 (at this moment, the pressure of the second fluid region S2 is substantially equal to atmospheric pressure).

When the spool assembly 105 needs to be moved to the left, the pressure relationship of the above two fluid regions S1 and S2 turns to be opposite, that is, the oil hydraulic pressure in the first fluid region S1 is lower than the oil hydraulic pressure in the second fluid region S2.

Referring to FIG. 4, when the oil hydraulic pressure in the second fluid region S2 is higher, as the catcher 164 is subjected to a greater lateral force F shown by the arrow in FIG. 4, the friction force between the catcher 162 and the sealing ring 165 becomes very great. As a result, the friction force between the catcher 162 and the sealing ring 165 when the spool assembly 105 moving to the left and the friction force between the catcher 162 and the sealing ring 165 when the spool assembly 105 moving to the right are significantly different, therefor the hysteresis of the directional control valve become asymmetrical when the spool assembly 105 moving in different directions.

Therefore, how to reduce the hysteresis of the directional control valve and how to avoid the asymmetrical hysteresis of the directional control valve when the spool assembly moving in different directions are urgent technical problems to be solved by those skilled in the art at present.

SUMMARY

Thus, a purpose of the present invention is to provide an actuator used for controlling the movement and displacement of a spool, and a spool type directional control valve equipped with the actuator, so that hysteresis of the directional control valve can be reduced, and asymmetrical hysteresis of the directional control valve when the spool moving in different directions can also be avoided.

In order to achieve the foregoing purpose, the present invention provides the following technical solutions.

An actuator used for controlling the movement and displacement of the spool is provided. The actuator includes:
- a catcher, provided with a first connecting portion and a second connecting portion, wherein the first connecting portion is used to connect to the spool, and the second connecting portion includes a first limiting portion and an avoidance slot which are connected in a circumferential direction; and
- a shaft, including a shaft body and a control member, wherein the shaft body is used to connect to an operation mechanism and is driven to rotate by the operation mechanism so as to enable the control member:
  a) to abut against the first limiting portion, and drive the catcher to rotate forward by a first angle a via the first limiting portion, so as to drive the spool to move forward to a first working position; and
  b) to rotate freely in the avoidance slot, wherein a maximum rotation angle c of the control member in the avoidance slot is not less than the first angle a.

Optionally, in the actuator, the second connecting portion further includes a second limiting portion therein, and the first limiting portion, the avoidance slot and the second limiting portion are connected sequentially in a circumferential direction;
- the control member is capable of abutting against the second limiting portion and driving the catcher to rotate backward by a second angle b via the second limiting portion, so as to drive the spool to move backward to a second working position; and
- the maximum rotation angle c is not less than a sum of the first angle a and the second angle b.

Optionally, in the actuator, the catcher is provided with a through hole, the shaft extends into the through hole, and a sidewall of the through hole is provided with the second connecting portion; and/or
the first connecting portion is a columnar structure.

Optionally, in the actuator, the sidewall of the through hole is provided with two or more the second connecting portions in a circumferential direction.

Optionally, in the actuator, an end of the shaft body is provided with an open groove; and
the control member is a connecting block located in the open groove, and one end or two ends of the connecting block extend out of the open groove in a radial direction of the shaft body to cooperate with the second connecting portion.

Optionally, the actuator further includes:
a bottom plate structure which is provided with a limiting slot; and
an elastic member which is located in the shaft body and is used to provide an axial preload force for the control member, so that the control member 252 is pressed into the limiting slot.

Optionally, in the actuator, the bottom plate structure is provided with an axial hole which is matched with an end of the shaft body.

Optionally, the actuator further includes a mechanism body, and the mechanism body is provided with an internal cavity capable of accommodating the catcher;
the bottom plate structure is fixed in the internal cavity; and
an end of the shaft body extends into the internal cavity and penetrates through the catcher to cooperate with the bottom plate structure.

Optionally, in the actuator, a limiting structure used for mounting the bottom plate structure is disposed in the mechanism body, and the limiting structure is connected to the bottom plate structure in a circumferential direction.

A spool type directional control valve which is provided with the actuator described above.

Optionally, the spool type directional control valve further includes:
- an operation mechanism which is connected to the shaft body of the actuator, and is used to control the rotation of the shaft;
- a spool which is provided with a pull rod for connecting to the first connecting portion of the catcher of the actuator; and
- a pilot valve which is used to control the movement and displacement of the spool.

It may be learned from the technical solutions that in the spool type directional control valve and the actuator thereof provided by the present invention, since the shaft connected to the operation mechanism is separated from the catcher which is directly connected to the spool, the operation process of the spool being controlled to move by the actuator is separated from the operation process of the spool being controlled to move by other means (for example, by a pilot valve).

That is to say, when the spool is controlled to move by other control means (such as a pilot valve) rather than by the actuator, the catcher moves with the spool together. However, since the catcher is provided with the avoidance slot, and the maximum rotation angle c of the control member in the avoidance slot is greater than the first angle a, so that the motion of the catcher will not drive the shaft and the operation mechanism to move.

It may be learned that the actuator does not have any effect on the operation processes when the valve is controlled to move and displace by other means; moreover, by the actuator, the problem of the hysteresis caused by friction between the catcher and the sealing ring during the rotation of the shaft can be avoided, and the asymmetrical hysteresis of the directional control valve when the spool moving in different directions described in the "BACKGROUND" can also be avoided completely.

BRIEF DESCRIPTION OF THE DRAWINGS

In order to explain the prior art and the technical solutions of the present invention more clearly, the drawings needed in the description of the prior art and embodiments of the present invention will be briefly introduced as below. Obviously, the drawings in the following description are only showing some embodiments of the present invention, and other similar drawings can be obtained without creative work by those skilled in the art based on drawings of the present invention.

DETAILED DESCRIPTION

Embodiments of the present invention provide an actuator for controlling movement and displacement of a spool and a spool type directional control valve provided with the actuator, by which hysteresis of the directional control valve can be reduced, and the asymmetrical hysteresis of the directional control valve when the spool moving in different directions can also be avoided.

Embodiments of the present invention will be clearly and completely described with referring to the accompanying drawings of the present application. Apparently, the described embodiments are a part of rather than all of embodiments of the present invention. Any other embodiments obtained by those skill in the art based on the described embodiments of the present invention without creative efforts shall fall within the protection scope of the present invention.

Referring to FIG. 6 to FIG. 30, embodiments of the present invention provide an actuator for controlling movement and displacement of a spool 201. The actuator includes a catcher 204 and a shaft 205.

The catcher 204 is provided with a first connecting portion 241 and a second connecting portion 242. The first connecting portion 241 is used for connecting to the spool 201, and the second connecting portion 242 includes a first limiting portion 2421 and an avoidance slot 2422 which are connected in a circumferential direction ("the circumferential direction" in the present invention specifically refers to "a direction along a circumference", the circumference refers to a circular trajectory centered on a rotation axis of the shaft 205 and located in a plane perpendicular to the rotation axis of the shaft 205).

The shaft 205 includes a shaft body 251 and a control member 252, the shaft body 251 is used for connecting to an operation mechanism 203, and the shaft 205 can be driven by the operation mechanism 203 to rotate back and forth in a preset range.

When the shaft 205 is driven by the operation mechanism 203 to rotate in a forward direction:

Firstly, the control member 252 rotates forward in the avoidance slot 2422 to a position where the control member 252 abuts against the first limiting portion 2421; then the control member 252 drives the first limiting portion 2421 to rotate continuously, so that the shaft 205 drives the catcher 204 to rotate forward by the control member 252; at this moment, the catcher 204 drives the spool 201 to move forward until the rotation angle of the catcher 204 reaches to a first angle a from the above described abutting position, and the spool 201 arrives at a first working position by moving forward.

It should be noted that, in a specific implementation, the valve provided with the actuator may also be controlled to work by other means (for example, controlled by a pilot valve). When the catcher 204 is controlled by other means to rotate and drive the spool 201 to move to the first working position, the control member 252 can rotate freely in the avoidance slot 2422. In order to prevent the catcher 204 from interfering with the control member 252 during operation processes controlled by other means, the maximum rotation angle c of the control member 252 in the avoidance slot 242 should not be less than the first angle a, that is, c≥a (a and c are both angle values, regardless of positive or negative). In the extreme case when c=a, it may be ensured that the control member 252 will not interfere with the catcher 204 by accurate structural design, so that the shaft 205 and the operation mechanism 203 will not be driven to move.

It should be noted that, if the actuator is used in a switch valve, the switch valve may be opened or closed when the spool 201 moves forward to a first working position; if the actuator is used in a proportional valve, an effect of adjusting the medium flow rate/pressure in proportion can be achieved in a process that the spool 201 moves forward to a first working position, and at the moment, "the first working position" is not only a limit position of the movement of the spool, but also corresponds to a limit value in the above-mentioned adjusting process of the proportional valve.

It may be learned that in the actuator provided by the present invention, since the shaft 205 connected to the operation mechanism 203 is separated from the catcher 204 which is directly connected to the spool 201, the operation process in which the spool is controlled to move by the actuator is separated from the operation process in which the spool is controlled to move by other means (for example, by a pilot valve).

That is to say, when the spool 201 is controlled to move by other control means (such as a pilot valve) rather than by the actuator, the catcher 204 moves with the spool 201 together. However, as the catcher 204 is provided with an avoidance slot 2422, and the maximum rotation angle c of the control member 252 in the avoidance slot 2422 is greater than or equal to the first angle a, when c>a, the moving catcher 204 will not touch the control member 252, so that the shaft 205 and the operation mechanism 203 will not be driven to move. Even in the extreme case when c=a, it may be ensured that the control member 252 does not interfere with the catcher 204 by accurate structural design, so that the shaft 205 and the operation mechanism 203 will not be driven to move.

It may be learned that the actuator does not have any impact on the operation processes when the valve provided with the actuator is controlled to move and displace by other means. Moreover, by using the actuator, the problem of the hysteresis caused by friction force between the rotating shaft 205 and the sealing ring 206 can be avoided, and the asymmetrical hysteresis of the directional control valve when the spool moving in different directions described in the "BACKGROUND" can also be avoided completely.

Further, when the actuator is applied in a three-position directional control valve, a second limiting portion 2423 is disposed in the second connecting portion 242. The first limiting portion 2421, the avoidance slot 2422 and the second limiting portion 2423 are connected sequentially in a circumferential direction. The maximum rotation angle c described above should not be less than a sum of the first angle a and the second angle b, that is, c≥a+b (a, b and c are all angle values, regardless of positive or negative). Moreover, when the shaft 205 rotates backward:

Firstly, the control member 252 rotates backward in the avoidance slot 2422 to a position where the control member 252 abuts against the second limiting portion 2423; then the control member 252 drives the second limiting portion 2423 to rotate continuously, so that the shaft 205 drives the catcher 204 to rotate backward via the control member 252, and at this moment, the catcher 204 drives the spool 201 to move backward until the rotation angle of the catcher 204 reaches to a second angle b from the above described abutting position, and the spool 201 arrives at a second working position by moving backward.

It should be noted that, in a specific implementation, the valve provided with the actuator may also be controlled to work by other means (for example, by a pilot valve). When the catcher 204 is controlled by other means to rotate and drive the spool 201 to move to the second working position, the control member 252 can rotate freely in the avoidance slot 2422. In order to prevent the catcher 204 from interfering with the control member 252 during operation processes controlled by other means, the maximum rotation angle c of the control member 252 in the avoidance slot 2422 should not be less than the second angle b.

In addition, the process that the spool moves to the first working position and the process that the spool moves to the second working position are two independent operation processes, and the rotation directions of the catcher 204 in the two operation processes are opposite, so that a maximum rotation angle c of the control member 252 in the avoidance slot 2422 should not be less than a sum of the first angle a and the second angle b, that is, c≥a+b (a, b and c are all angle values, regardless of positive or negative). In the extreme case when c=a+b, it can be ensured that the control member 252 does not interfere with the catcher 204 by accurate structural design, so that the shaft 205 and the operation mechanism 203 will not be driven to move.

It should be noted that, if the actuator is used in a switch valve, the switch valve is opened or closed when the spool 201 moves backward to a second working position; if the actuator is used is a proportional valve, an effect of adjusting the medium flow rate/pressure in proportion can be achieved in a process that the spool 201 moves backward to a second working position, and at the moment, "the second working position" is not only another limit position of the movement of the spool, but also corresponds to another limit value in the above-mentioned adjusting process of the proportional valve.

In a specific implementation, referring to FIG. 15 to FIG. 18, the catcher 204 is provided with a through hole, and the shaft 205 extends into the through hole. A sidewall of the through hole is provided with the second connecting portion 242. Preferably, the sidewall of the through hole is provided with two or more second connecting portions 242 in a circumferential direction, so as to facilitate a stable connection between the shaft 205 and the catcher 204.

In a specific implementation, the above-mentioned first connecting portion 241 of the catcher 204 is a columnar structure, and correspondingly, a pull rod 211 located at an end of the spool 201 is provided with an open slot matched with the columnar structure. For example, the open slot may be a U-shaped open slot. Therefore, a transmission connection between the catcher 204 and the spool 201 is achieved. However, it is not limited thereto, and in other specific embodiments, other connection structures may be used between the catcher 204 and the spool 201. For example, the catcher 204 and the spool 201 may be hinged by a pin and through hole structure.

Figure 9:
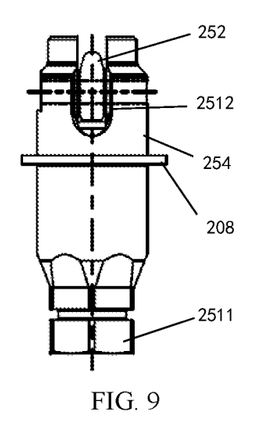
FIG. 9 is a front view of a shaft with a gasket shown in FIG. 8.
Figure 10:
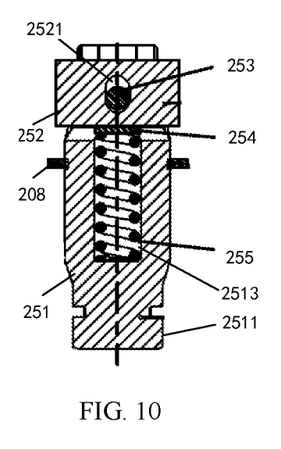
FIG. 10 is a side-viewed cross-sectional diagram of the shaft with the gasket shown in FIG. 8.
Figure 11:
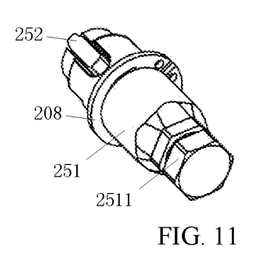
FIG. 11 is an isometric view of the shaft with the gasket shown in FIG. 8.
Figure 12:
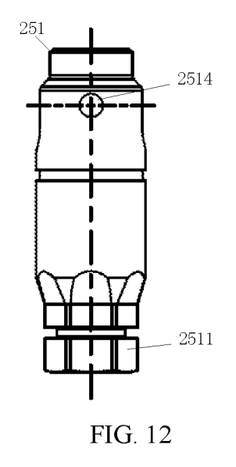
FIG. 12 is a side view of a shaft body shown in FIG. 9.

Specifically, referring to FIG. 9 to FIG. 11, an end of the shaft body 251 is provided with an open groove 2512 (a radial through hole in general). The control member 252 is a connecting block located in the open groove 2512, and one end or two ends of the connecting block extend out of the open groove 2512 in a radial direction of the shaft body 251 to cooperate with the second connecting portion 242.

Figure 6:
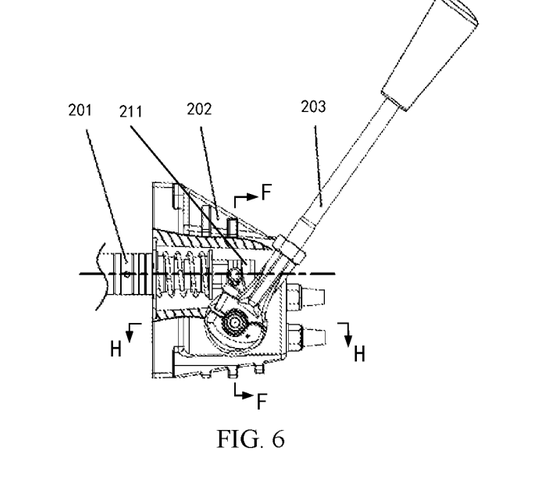
FIG. 6 is a schematic diagram illustrating an internal structure of an actuator provided by an embodiment of the present invention.
Figure 7:
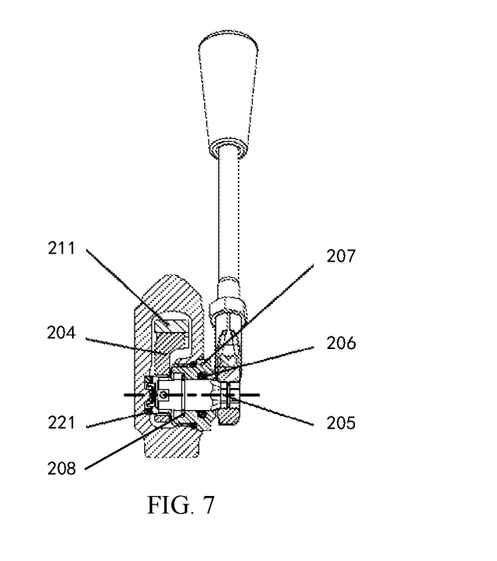
FIG. 7 is a cross-sectional diagram taken along line F-F shown in FIG. 6.
Figure 8:
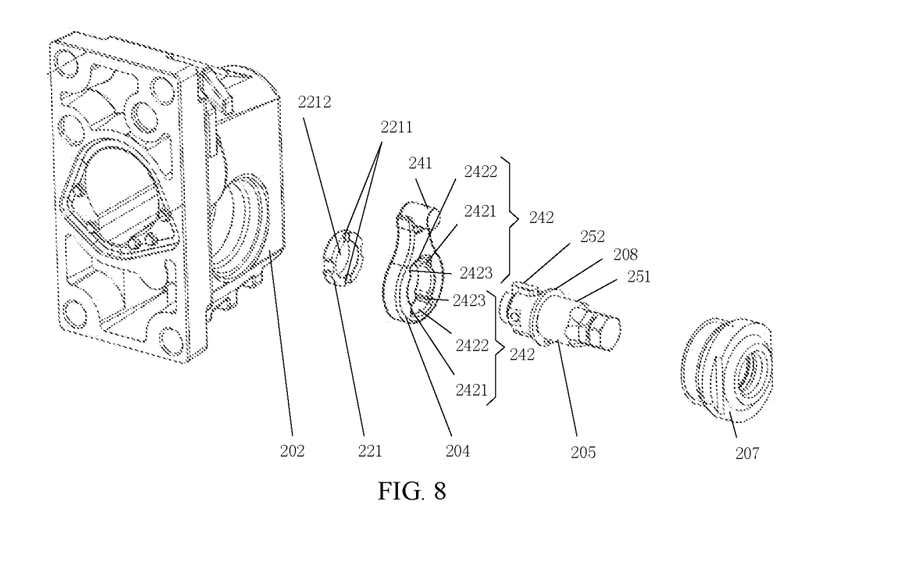
FIG. 8 is a schematic exploded diagram of an actuator provided by an embodiment of the present invention.

Referring to FIG. 6 to FIG. 8, in a specific implementation, the catcher 204 is located in the cavity of the mechanism body 202, an end of the shaft 205 is connected to the operation mechanism 203 (such as a handle), and the other end of the shaft 205 extends into the mechanism body 202 through the sidewall of the mechanism body 202. The sidewall of the mechanism body 202 is provided with a threaded mounting hole, and the shaft 205 is mounted in the mounting hole via a threaded plug 207, and the sealing is achieved by a sealing ring 206. In order to limit the axial position of the shaft 205, an annular limiting slot is formed on the shaft 205. A gasket 208 is mounted in the annular limiting slot, and the gasket 208 abuts against the threaded plug 207, so that it can be achieved to limit the axial position between the shaft 205 and the threaded plug 207 by the gasket 208, and the shaft 205 is prevented from being separated from the mechanism body 202 in the axial direction.

Further, referring to FIG. 19 to FIG. 24, the actuator further includes a bottom plate structure 221 and an elastic member 255. The bottom plate structure 221 is provided with a limiting slot 2211 The elastic member 255 is located in the shaft body 251 (for details, please refer to FIG. 10 to FIG. 13 in which an internal accommodating groove 2513 is shown). The elastic member 255 is used for providing an axial preload force for the control member 252, so that the control member 252 is pressed into the limiting slot 2211, and therefore, the shaft 205 and the operation mechanism 203 connected to the shaft 205 keep still automatically, and self-locking is achieved.

When the operation mechanism 203 controls the shaft 205 to rotate, the control member 252 will compress the elastic member 255, separate from the limiting slot 2211 of the bottom plate structure 221, and continue to rotate with the shaft 205 together, so that the catcher 204 is controlled to drive the spool to move.

When the operation mechanism 203 controls the shaft 205 to rotate back to the neutral position, under the action of the elastic member 255, the control member 252 returns back into the limiting slot 2211 of the bottom plate structure 221 automatically to achieve self-lock, so that the operation mechanism can be surely kept at the neutral position stably and does not rotate at random.

Specifically, the elastic member 255 may be a compressing spring. A plate 254 is also disposed between the compressing spring and the control member 252. Via the plate 254, the compressing spring can be limited in the internal accommodating groove 2513 of the shaft body 251, and it is beneficial to transmit the restoring force of the compressing spring to the control member 252 stably to ensure the stable operation of the control member 252 and avoid jamming.

In a specific implementation, the bottom plate structure 221 is further provided with an axial hole 2212 which is matched with an end of the shaft body 251, so that the position of the shaft 205 can be limited by the axial hole 2212 of the bottom plate structure 221, which is beneficial to improve coaxiality of the shaft 205 and the mounting hole of the mechanism body, and ensure the stability and working reliability during manual operation of the actuator.

In a specific implementation, the bottom plate structure 221 may be an independent part mounted in the mechanism body 202, or the bottom plate structure 221 may be a similar structure having a limiting slot 2211 and being formed on the inner wall of the mechanism body 202.

In a specific implementation, the actuator further includes a pin 253. The control member 252 is mounted in the open groove 2512 of the shaft body 251 by the pin 253. Either the control member 252 or the shaft body 251 is provided with a strip-shaped hole matched with the pin 253, and the length direction of the strip-shaped hole is parallel to the central axis of the shaft body 251. For example, referring to FIG. 9 to FIG. 14, the control member 252 is provided with a strip-shaped hole 2521 for the pin 253 to pass through, and the pin 253 is in clearance fit with the strip-shaped hole 2521, so that the control member 252 is movable in the length direction of the strip-shaped hole 2521 (i.e., the axial direction of the shaft body 251). The shaft body 251 is provided with two mounting holes 2514 respectively on both sides of the open groove 2512, and the mounting holes 2514 are in interference fit with the pin 253, so as to ensure that the control member 252 will not detach from the shaft 205 under working conditions.

Figure 21:
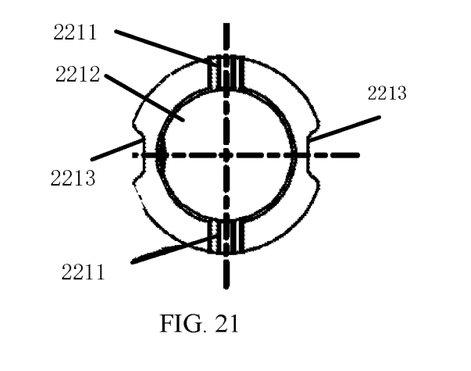
FIG. 21 is a front view of the bottom plate structure provided by an embodiment of the present invention.
Figure 22:
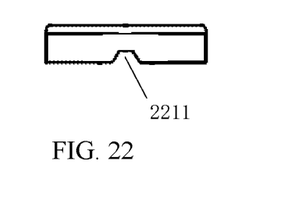
FIG. 22 is a top view of the bottom plate structure provided by an embodiment of the present invention.
Figure 23:
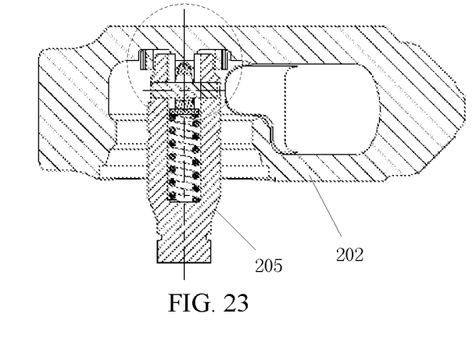
FIG. 23 is a cross-sectional diagram taken along line H-H shown in FIG. 6.
Figure 24:
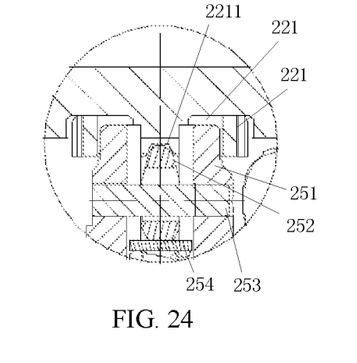
FIG. 24 is an enlarged view of a circular-dashed area shown in FIG. 23.

It should be noted that, referring to FIG. 21 and FIG. 22, the cross section of the limiting slot 2211 may have a cross section in V shape, isosceles trapezoid shape or arc shape.

Figure 13:
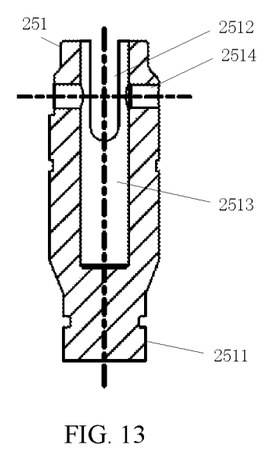
FIG. 13 is a half-sectional diagram of the shaft body shown in FIG. 9.
Figure 14:
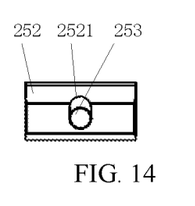
FIG. 14 is a side view of a control member shown in FIG. 9.
Figure 15:
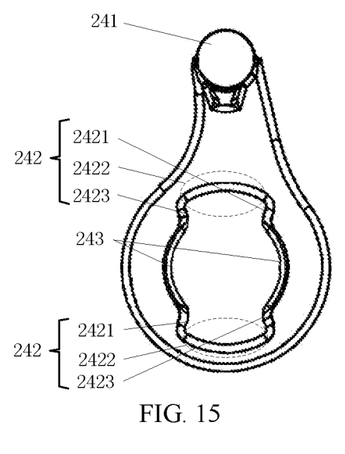
FIG. 15 is a front view of a catcher shown in FIG. 8.
Figure 16:
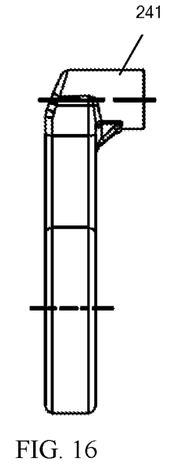
FIG. 16 is a left side view of the catcher shown in FIG. 8.
Figure 17:
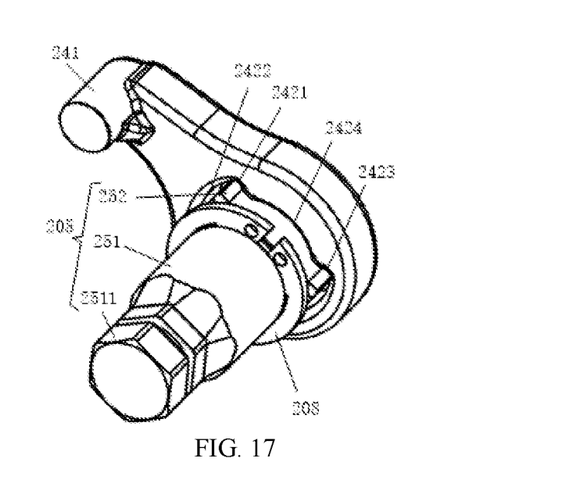
FIG. 17 is an isometric view of an assembly of the shaft with the gasket and the catcher shown in FIG. 8.
Figure 18:
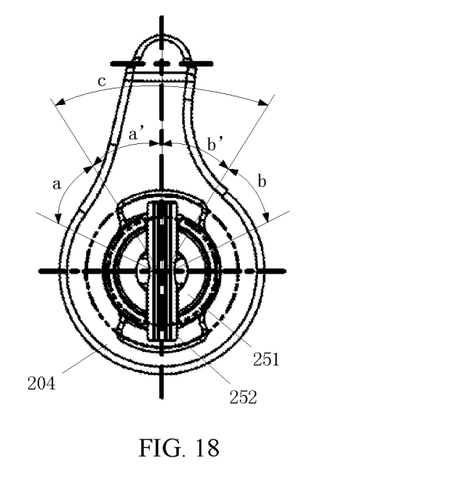
FIG. 18 is a rear view of the assembly shown in FIG. 17.
Figure 19:
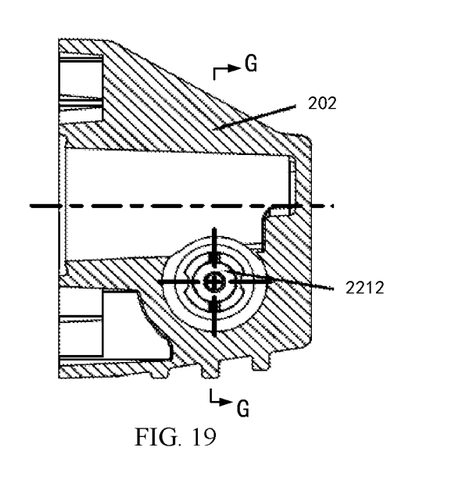
FIG. 19 is a schematic diagram of a mounting structure of a bottom plate structure in a mechanism body provided by an embodiment of the present invention.
Figure 20:
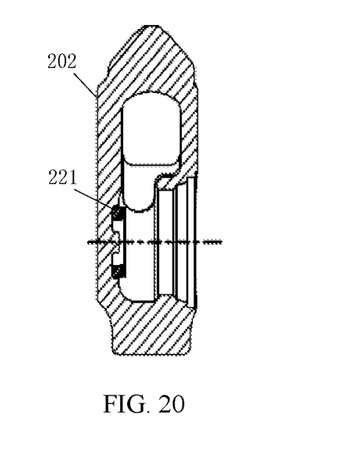
FIG. 20 is a cross-sectional diagram taken along line G-G shown in FIG. 19.

The above-mentioned axial hole 2212 is a circular blind hole coaxial with the shaft body 252. Referring to FIG. 10 and FIG. 13, the above-mentioned open groove 2512 may be a U-shaped slot, and its center plane is the center plane of the shaft body 251. However, it is not limited thereto, and in other embodiments, a technician may adopt other similar structures to achieve the same function, and therefore, the above-mentioned specific structures are not specifically limited in the present invention.

In a specific implementation, the above-mentioned actuator may be used in a newly designed directional control valve. In addition, a conventional actuator in a directional control valve may be detached and be replaced with the above-mentioned actuator of the present invention, so that the directional control valve can be improved and upgraded, and the cost can be saved.

Further, the above-mentioned actuator of the present invention further includes a mechanism body 202. Referring to FIG. 6 to FIG. 8, FIG. 19 and FIG. 20, the mechanism body 202 is provided with an inner cavity capable of accommodating the catcher 204. The bottom plate structure 221 is fixed in the inner cavity. An end of the shaft 205 extends into the inner cavity and penetrates through the catcher 204 to cooperate with the bottom plate structure 221.

Preferably, a limiting structure used for mounting the bottom plate structure 221 is disposed in the mechanism body 202. For example, referring to FIG. 21, two sides of the bottom plate structure 221 are provided with connection slots 2213, and an inner wall of the mechanism body 202 is provided with connection protrusions. Via the connection slots 2213 and the connection protrusions, the bottom plate structure 221 can be fixedly mounted in the mechanism body and keep still. And the axial position of the bottom plate structure 221 can be limited via the shaft 205. For example, a limiting structure used for mounting the bottom plate structure 221 is provided in the mechanism body 202, the limiting structure is a groove hole specifically, and the bottom plate structure 221 is provided with connection protrusions or pins matched therewith. However, it is not limited thereto, and in other specific embodiments, the circumferential connection between the limiting structure and the bottom plate structure 221 may also be achieved in other ways.

In a specific implementation, preferably, the control member 252 has a wedge-shaped block structure, and a thinner part of the control member 252 is matched with the limiting slot 2211 of the bottom plate structure 221. However, it is not limited thereto, and in other specific embodiments, the control member 252 may also be designed as a columnar member, which may have a cross section in triangular shape, isosceles trapezoid shape, elliptical shape, circular shape, or other structure forms. It is not specifically limited thereto in the present invention, as long as the control member 252 can achieve the above-mentioned functions of abutting and driving, connection limiting, etc.

In a specific implementation, the operation mechanism 203 is a long handle, and an end of the control member 203 is provided with a polygonal mounting hole. Correspondingly, the cross section of the connection end 2511 (for connecting to the operation mechanism 203) of the shaft body 251 is with a polygonal shape (such as hexagon), so that the rotation can be controlled by the operation mechanism 203.

The embodiments of the present invention further provide a spool type directional control valve, and the spool type directional control valve is provided with the above-mentioned actuator.

Specifically, the spool type directional control valve further includes an operation mechanism 203, a spool 201 and pilot valves. The operation mechanism 203 is connected to the shaft body 251 of the actuator, and the operation mechanism 203 is used for controlling the rotation of the shaft 205. The spool 201 is provided with a pull rod 211 which is used for connecting to the first connecting portion 241 of the catcher 204 of the actuator. The pilot valves are used for controlling the movement and displacement of the spool 201.

Figure 25:
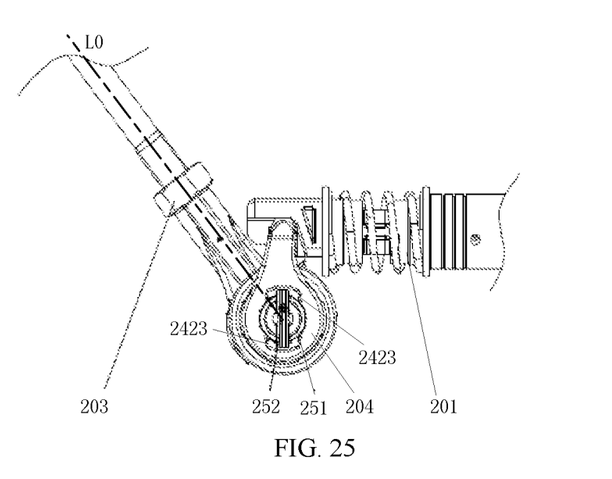
FIG. 25 is a front view of an actuator in a neutral position provided by an embodiment of the present invention.
Figure 26:
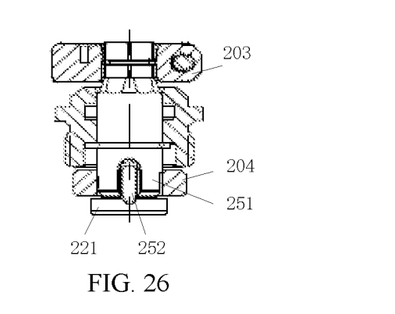
FIG. 26 is a diagram illustrating a relative position relationship between a control member and a catcher corresponding to FIG. 25.

In a specific implementation, referring to FIG. 17 to FIG. 19 and FIG. 25 to FIG. 30:

Referring to FIG. 25 and FIG. 26, a normal position L0 of the operation mechanism 203 corresponds to a neutral position.

Figure 27:
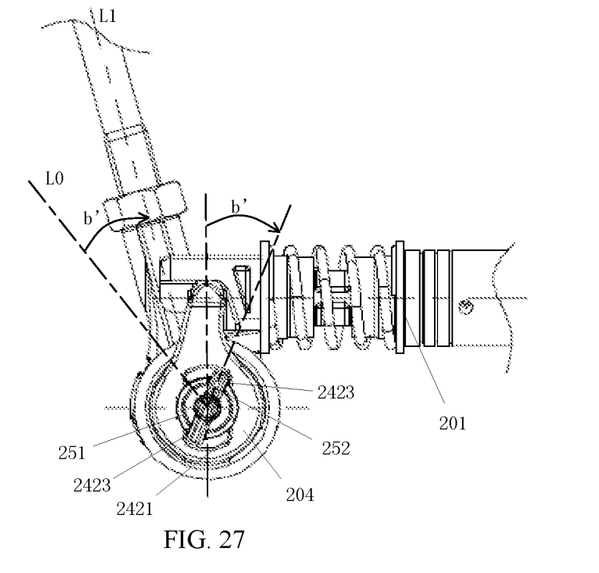
FIG. 27 is a front view of the actuator provided by an embodiment of the present invention, in which a shaft is driven by an operation mechanism to rotate by an angle b from the neutral position.
Figure 28:
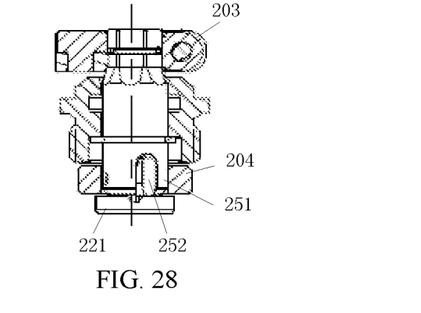
FIG. 28 is a diagram illustrating a relative position relationship between the control member and the catcher corresponding to FIG. 27.
Figure 29:
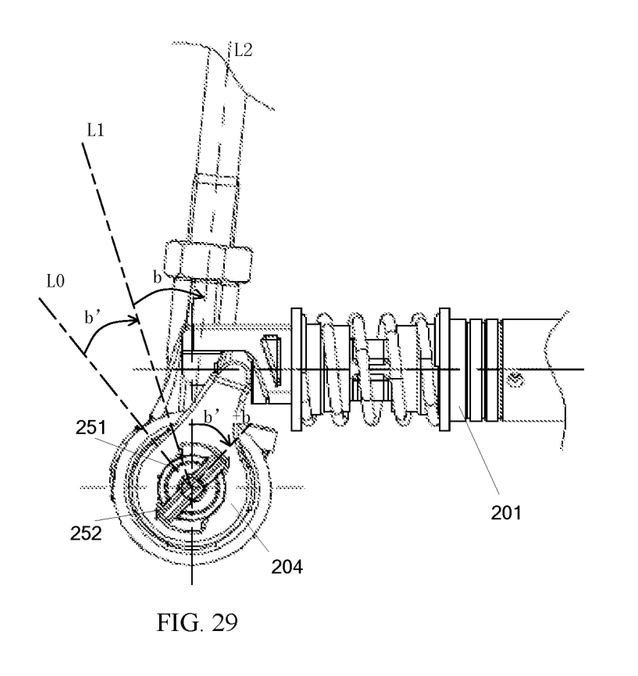
FIG. 29 is a front view of the actuator provided by an embodiment of the present invention, in which the shaft and the catcher are driven by the operation mechanism to rotate by the angle b continuously.
Figure 30:
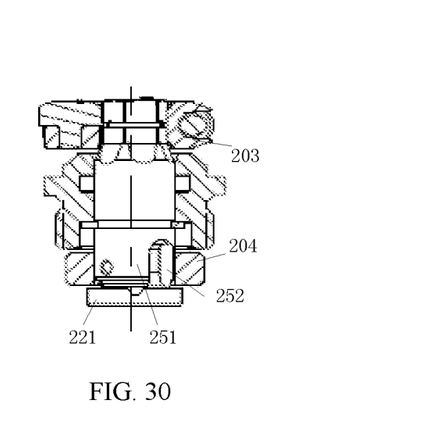
FIG. 30 is a diagram illustrating a relative position relationship between the control member and the catcher corresponding to FIG. 29.

Referring to FIG. 27 and FIG. 28, the control member 252 is just in contact with the second limiting portion 2423 of the catcher 204 when the operation mechanism 203 is controlled to rotate rightward by a certain angle, for example, from the position L0 to the position L1 shown in FIG. 27, wherein the rotation angle is b', b'=b+$\Delta$b ($\Delta$b$\geq$0, and b is the second angle described above);

Referring to FIG. 29 and FIG. 30, the operation mechanism 203 is continuously controlled to rotate rightward by the angle b (the second angle described above), for example, the operation mechanism 203 shown in FIG. 29 rotates from the position L1 to the position L2, and the spool 201 is driven to move rightward from the neutral position to the second working position.

Correspondingly, when the spool is controlled to move leftward to the first working position via controlling the operation mechanism 203 to rotate leftward by a certain angle from the normal position shown in FIG. 25, the process is opposite, that is:

the control member 252 is just in contact with the first limiting portion 2421 of the catcher 204 when the operation mechanism 203 is controlled to rotate leftward by a certain angle, wherein when the rotation angle is a', a'=a+$\Delta$a ($\Delta$a$\geq$0, a is the first angle described above).

The operation mechanism 203 is continuously controlled to rotate leftward by the angle a (the first angle described above), and the spool 201 is driven to move leftward from the neutral position to the first working position.

Preferably, the value ranges of the first angle a and the second angle b are both between 10°-30°, the value ranges of $\Delta$a and $\Delta$b are both between 0°-30°, preferably $\Delta$a and $\Delta$b are both greater than zero, so that when the spool 201 is controlled by other control means (such as pilot valve) rather than by the actuator, the interference between the catcher 204 and the control member 252 are avoided. For example, in a specific embodiment, a=b=20°, and $\Delta$a=$\Delta$b=1°.

It should be noted that the maximum rotation angle of the control member 252 in the avoidance slot 2422 of the catcher 204 is c, and c=a'+b'=a+$\Delta$a+b+$\Delta$b. When the spool 201 is controlled by other control means (such as pilot valve) rather than by the actuator to move, the catcher 204 moves with the spool 201 together. However, since the catcher 204 is provided with the above-mentioned avoidance slot 2422, the moving catcher 204 will not be in contact with the control member 252, so that the shaft 205 and the operation mechanism 203 will not be driven to move. It may be learned that the actuator will not bring any impact when the valve is controlled to move and displace by other means; moreover, by using the actuator, the problem of hysteresis caused by friction between the shaft 205 and the sealing ring 206 during the rotation of the shaft 205 can be avoided, and the asymmetrical hysteresis of the directional control valve when the spool moving in different directions can also be avoided completely In conclusion, the spool type directional control valve provided by the present invention can be applied to various hydraulic machines such as engineering machinery, agricultural machinery, mining machinery and the like.

Finally, it also should be noted that in the present invention, the relationship terms, such as first and second, are merely herein distinguish an entity or operation from another entity or operation, and do not necessarily require or imply any such actual relationship of order between these entities of operations. Moreover, the terms "comprising", "including" or any other variant thereof are not intended to cover a non-exclusive inclusion, such that processes, methods, articles or devices, which include a series of elements, include not only those elements, but also other elements which are not listed expressly, or include the inherent elements of the processes, methods, articles or devices. In the case without any more restrictions, the element defined by the sentence "comprising a . . . " does not exclude the presence of additional identical elements in the processes, methods, articles or devices that include the element.

Various embodiments in the present specification are described in a progressive manner, each embodiment focuses on the difference from other embodiments, and the same or similar parts in the embodiments can be referred to each other.

The above description of the embodiments of the present invention enables a person skilled in the art to implement or use the present invention. Various modifications to these embodiments will be obvious to those skilled in the art, and the general principles defined herein may be implemented in other embodiments without departing from the spirit or scope of the invention. Therefore, the present invention will not be limited to these embodiments shown herein, but it includes a widest scope consistent with the principles and novel features disclosed herein.

What is claimed is:

1. An actuator, used for controlling the movement and displacement of a spool, wherein, the actuator comprises:
 a catcher, provided with a first connecting portion and a second connecting portion, wherein the first connecting portion is used for connecting to the spool, and the second connecting portion comprises a first limiting portion and an avoidance slot which are connected in a circumferential direction; and
 a shaft, comprising a shaft body and a control member, wherein the shaft body is used for connecting to an operation mechanism and is driven to rotate by the operation mechanism so as to enable the control member:
  to abut against the first limiting portion, and drive the catcher to rotate forward by a first angle a via the first limiting portion, so as to drive the spool to move forward to a first working position; and
  to rotate freely in the avoidance slot, wherein a maximum rotation angle c of the control member in the avoidance slot is not less than the first angle a;
 wherein, the second connecting portion further comprises a second limiting portion, and the first limiting portion, the avoidance slot and the second limiting portion are connected sequentially in a circumferential direction;
 the control member is capable of abutting against the second limiting portion, and driving the catcher to rotate backward by a second angle b via the second limiting portion, so as to drive the spool to move backward to a second working position; and the maximum rotation angle c is not less than a sum of the first angle a and the second angle b.

2. The actuator according to claim 1, wherein, the catcher is provided with a through hole, the shaft extends into the through hole, and a sidewall of the through hole is provided with the second connecting portion; and/or the first connecting portion is a columnar structure.

3. The actuator according to claim 2, wherein, an end of the shaft body is provided with an open groove;

the control member is a connecting block located in the open groove, and one end or two ends of the connecting block extend out of the open groove in a radial direction of the shaft body to cooperate with the second connecting portion.

4. A spool type directional control valve provided with the actuator according to claim 2.

5. The actuator according to claim 2, wherein, the sidewall of the through hole is provided with two or more the second connecting portions in a circumferential direction.

6. The actuator according to claim 5, wherein, an end of the shaft body is provided with an open groove;

the control member is a connecting block located in the open groove, and one end or two ends of the connecting block extend out of the open groove in a radial direction of the shaft body to cooperate with the second connecting portion.

7. A spool type directional control valve provided with the actuator according to claim 5.

8. The actuator according to claim 1, wherein, an end of the shaft body is provided with an open groove;

the control member is a connecting block located in the open groove, and one end or two ends of the connecting block extend out of the open groove in a radial direction of the shaft body to cooperate with the second connecting portion.

9. A spool type directional control valve provided with the actuator according to claim 8.

10. The actuator according to claim 8, wherein, the actuator further comprises:

a bottom plate structure which is provided with a limiting slot; and an elastic member which is located in the shaft body, and is used to provide an axial preload force for the control member, so that the control member is pressed into the limiting slot.

11. A spool type directional control valve provided with the actuator according to claim 10.

12. The actuator according to claim 10, wherein, the bottom plate structure is provided with an axial hole which is matched with an end of the shaft body.

13. A spool type directional control valve provided with the actuator according to claim 12.

14. The actuator according to claim 10, wherein, the actuator further comprises a mechanism body, and the mechanism body is provided with an internal cavity capable of accommodating the catcher;

the bottom plate structure is fixed in the internal cavity; and an end of the shaft extends into the internal cavity and penetrates through the catcher to cooperate with the bottom plate structure.

15. The actuator according to claim 14, wherein, a limiting structure used for mounting the bottom plate structure is disposed in the mechanism body, and the limiting structure is connected to the bottom plate structure in a circumferential direction.

16. A spool type directional control valve provided with the actuator according to claim 1.

17. The spool type directional control valve according to claim 16, further comprising:

the operation mechanism which is connected to the shaft body of the actuator, and is used to control the rotation of the shaft; and the spool which is provided with a pull rod for connecting to the first connecting portion of the catcher in the actuator; and a pilot valve which is used to control the movement and displacement of the spool.

18. An actuator, used for controlling the movement and displacement of a spool, wherein, the actuator comprises:

a catcher, provided with a first connecting portion and a second connecting portion, wherein the first connecting portion is used for connecting to the spool, and the second connecting portion comprises a first limiting portion and an avoidance slot which are connected in a circumferential direction; and a shaft, comprising a shaft body and a control member, wherein the shaft body is used for connecting to an operation mechanism and is driven to rotate by the operation mechanism so as to enable the control member:

to abut against the first limiting portion, and drive the catcher to rotate forward by a first angle a via the first limiting portion, so as to drive the spool to move forward to a first working position; and to rotate freely in the avoidance slot, wherein a maximum rotation angle c of the control member in the avoidance slot is not less than the first angle a;

wherein, an end of the shaft body is provided with an open groove;

the control member is a connecting block located in the open groove, and one end or two ends of the connecting block extend out of the open groove in a radial direction of the shaft body to cooperate with the second connecting portion;

wherein, the actuator further comprises:

a bottom plate structure which is provided with a limiting slot; and an elastic member which is located in the shaft body, and is used to provide an axial preload force for the control member, so that the control member is pressed into the limiting slot;

wherein, the actuator further comprises a mechanism body, and the mechanism body is provided with an internal cavity capable of accommodating the catcher;

the bottom plate structure is fixed in the internal cavity; and an end of the shaft extends into the internal cavity and penetrates through the catcher to cooperate with the bottom plate structure.

19. The actuator according to claim 18, wherein, a limiting structure used for mounting the bottom plate structure is disposed in the mechanism body, and the limiting structure is connected to the bottom plate structure in a circumferential direction.

\* \* \* \* \*